(12) United States Patent
Radtke et al.

(10) Patent No.: US 10,632,692 B2
(45) Date of Patent: Apr. 28, 2020

(54) PROCESS FOR THE PRODUCTION OF FINISHED PARTS

(71) Applicant: BASF SE, Ludwigshafen (DE)

(72) Inventors: Andreas Radtke, Mannheim (DE); Dagmar Buerckel, Neustadt (DE); Andreas Nixdorf, Mannheim (DE); Oliver Kraemer, Gimbsheim (DE)

(73) Assignee: BASF SE, Ludwigshafen (DE)

( * ) Notice: Subject to any disclaimer, the term of this patent is extended or adjusted under 35 U.S.C. 154(b) by 348 days.

(21) Appl. No.: 15/526,393

(22) PCT Filed: Nov. 4, 2015

(86) PCT No.: PCT/EP2015/075707
§ 371 (c)(1),
(2) Date: May 12, 2017

(87) PCT Pub. No.: WO2016/075010
PCT Pub. Date: May 19, 2016

(65) Prior Publication Data
US 2018/0290401 A1    Oct. 11, 2018

(30) Foreign Application Priority Data

Nov. 14, 2014 (EP) .................................... 14193212

(51) Int. Cl.
| | | |
|---|---|---|
| *B29C 70/34* | (2006.01) | |
| *C08J 5/18* | (2006.01) | |
| *B29C 37/00* | (2006.01) | |
| *B29C 45/14* | (2006.01) | |

(Continued)

(52) U.S. Cl.
CPC .......... *B29C 70/34* (2013.01); *B29C 37/0028* (2013.01); *B29C 45/14* (2013.01); *C08J 5/18* (2013.01); *B29K 2677/00* (2013.01); *B29L 2031/30* (2013.01); *C08J 2377/02* (2013.01)

(58) Field of Classification Search
CPC ..... B29C 70/34; B29C 37/0028; B29C 45/14; B29C 45/16; B29C 66/7377; B29C 66/73773; B29C 66/73774; B29C 66/73775; B29C 66/73776; B29C 31/08; B29C 43/006; B29C 45/14631; B29C 45/14786; B29C 48/2886; B29C 51/14; B29C 51/145; B29C 65/3636; B29C 70/02; B29C 70/06; B29C 70/08; B29C 70/081;

(Continued)

(56) References Cited

U.S. PATENT DOCUMENTS

| | | | | |
|---|---|---|---|---|
| 3,764,449 A | * | 10/1973 | Beeler ................ | C08G 73/1003 442/117 |
| 5,178,964 A | * | 1/1993 | Scola ........................ | C08J 5/24 156/307.4 |

(Continued)

FOREIGN PATENT DOCUMENTS

| | | |
|---|---|---|
| CN | 104010797 A | 8/2014 |
| DE | 102011083162 A1 | 3/2013 |
| EP | 2 669 076 A1 | 12/2013 |

(Continued)

OTHER PUBLICATIONS

International Search Report dated Feb. 17, 2016 in corresponding PCT/EP2015/075707.
M. Ostgathe, "Zur Serienfertigung gewebeverstärkter Halbzeuge für die Umformung", Fortschritt-Berichte VDI 2(440), 1977, pp. 48-51.
Andreas Wöginger, "Prozesstechnologien zur Herstellung kontinuierlich faserverstärkter thermos-plastischer Halbzeuge", Institut für Verbundwerkstoffee-GmbH-Kaiswerslautem publications, vol. 41, 2004, p. 4-6 with cover page.
Marco Wacker, et al., "Schweißen and Umspritzen von Organoblechen", KU Kunststoffe, Carl hanser Verlag , Munich, 1992 (2002), pp. 78-81.
Japanese Office Action dated Sep. 17, 2019, in Japanese Patent Application No. 2017-526094 (with English Translation).

*Primary Examiner* — Stella K Yi
(74) *Attorney, Agent, or Firm* — Oblon, McClelland, Maier & Neustadt, L.L.P.

(57) ABSTRACT

The invention relates to a process for the production of finished parts made of at least one multilayer, fiber-reinforced, flat semifinished-product structure, comprising the following steps:
a) heating of the at least one multilayer, fiber-reinforced, flat semifinished-product structure at ambient pressure to a first temperature $T_a$, where the at least one multilayer, fiber-reinforced, flat semifinished-product structure comprises at least two mutually superposed polymer layers and the individual polymer layers respectively have fiber-reinforcement and do not have coherent bonding to one another or have only partial coherent bonding to one another, and in the event that at least one of the polymer layers comprises a semicrystalline polymer the first temperature $T_a$ is higher than a melting point $T_m$ of the crystalline polymer in accordance with DIN EN ISO 11357-3:2013-04, and in the event that the at least two polymer layers comprise no semicrystalline polymer the first temperature $T_a$ is higher than a glass transition temperature $T_g$ in accordance with DIN EN ISO 11357-2:2013-09 of a polymer comprised in at least one of the at least two polymer layers,
b) pressing of the heated at least one multilayer, fiber-reinforced, flat semifinished-product structure to give a finished part at a second temperature $T_b$ and at a pressure $p_b$ of at least 3 bar.

20 Claims, No Drawings

(51) Int. Cl.
*B29K 677/00* (2006.01)
*B29L 31/30* (2006.01)

(58) Field of Classification Search
CPC ....... B29C 70/083; B29C 70/10; B29C 70/30; B29C 70/305; C08J 5/18
See application file for complete search history.

(56) References Cited

U.S. PATENT DOCUMENTS

2011/0155854 A1\* 6/2011 Bakker ............. B29C 45/14221
244/132
2014/0370245 A1 12/2014 Nagakura et al.

FOREIGN PATENT DOCUMENTS

WO WO 2013/094702 A1 6/2013
WO WO 2015/022174 A1 2/2015

\* cited by examiner

PROCESS FOR THE PRODUCTION OF FINISHED PARTS

The invention relates to a process for the production of finished parts made of at least one multilayer, fiber-reinforced, flat semifinished-product structure, by heating and pressing the at least one semifinished-product structure.

Finished parts made of fiber-reinforced polymers are used by way of example in sectors where the intention is to use materials with high strength and with lower weight than metals. In particular, finished parts made of fiber-reinforced polymers are used in automobile construction, in order to reduce the mass of vehicles and thus also fuel consumption.

Finished parts made of fiber-reinforced polymers, where the polymer phase surrounding the fibers is also termed matrix, are often produced from intermediate products, for example from what are known as organopanels, these being fully impregnated and fully consolidated continuous-filament-fiber-reinforced thermoplastic polymers, with reinforcement by woven fabric or laid scrim. Organopanels are obtained by bonding individual layers of a fully polymer-impregnated laminate to one another in a manner that almost entirely excludes pores, another expression used to describe this product being fully consolidated. The organopanels can have been produced from what are known as prepregs. Prepregs comprise a finely dispersed thermoplastic matrix which does not completely wet the reinforcing fibers. In a subsequent step, the prepregs are fully impregnated and consolidated.

M. Ostgathe, in "Zur Serienfertigung gewebeverstärkter Halbzeuge für die Umformung" [Mass production of textile-reinforced semifinished products for the forming process], Fortschritt-Berichte VDI 2(440), 1977, pp. 48-51, studies the dependency of the properties of moldings on the semifinished-product structures used. Semifinished-product structures used were organopanels, hybrid textiles, and calendered semifinished-product structures. The hybrid textiles comprise reinforcement fibers and matrix fibers, but there is no bonding of any kind between fiber and matrix. The calendered semifinished-product structures were produced by calendering hybrid textiles, thus melting the matrix and substantially wetting the reinforcing fibers. Both hybrid textiles and calendered material fall within the definition of thermoplastic prepregs. Components produced from organopanels exhibited markedly better mechanical properties than components produced from calendered semifinished-product structures or from hybrid textiles. Satisfactory mechanical properties and suitability for mass production are obtained only with fully impregnated and fully multilayer-consolidated semifinished-product structures.

Page 15 of Ostgathe describes the production of unidirectionally reinforced tapes which themselves have been impregnated and consolidated as individual layers and, in a subsequent step, can be processed as layers to give semifinished sheets. The textile processing of these tapes is complicated, and process times are described as being longer than those required when fully impregnated semifinished products are subjected to the forming process, since the starting material is unconsolidated. The forming process for semifinished products reinforced by unidirectional tapes requires fully consolidated semifinished sheets made of tape structures, another term for these being tape layups, and this requires the additional step of consolidation of multilayer semifinished sheets after tape production.

A. Woginger, in "Prozesstechnologien zur Herstellung kontinuierlich faserverstärkter thermoplastischer Halbzeuge" [Process technologies for the production of continuously fiber-reinforced semifinished thermoplastic products], Institut für Verbundwerkstoffe-GmbH-Kaiserslautern publications, vol. 41, 2004, pp. 4 to 6, mentions the three fundamental parts of the process for semifinished-product production: impregnation, consolidation, and conversion to the solid state. The consolidation phase here serves for the production of a good bond between the individual reinforcement layers of a composite material. After the impregnation phase and the consolidation phase the material ideally is a pore-free composite. Other processes that can also be used, if material throughputs require, are film-stacking processes, prepreg processes, and direct processes, where the direct process combines the matrix component and the fiber component in the press process for the production of the semifinished-product structure.

The processes known in the prior art have the disadvantages that a complicated process is carried out for full consolidation of the multilayer semifinished-product structure and, respectively, that without full multilayer consolidation of the semifinished-product structure the mechanical properties of the resultant finished parts are inadequate.

It is an object of the present invention to provide a process which produces finished parts made of multilayer, fiber-reinforced, flat semifinished-product structures and which can produce finished parts more effectively and with identical or improved mechanical properties.

Said object is achieved via a process for the production of finished parts made of at least one multilayer, fiber-reinforced, flat semifinished-product structure, comprising the following steps:

a) heating of the at least one multilayer, fiber-reinforced, flat semifinished-product structure at ambient pressure to a first temperature $T_a$, where the at least one multilayer, fiber-reinforced, flat semifinished-product structure comprises at least two mutually superposed polymer layers and the individual polymer layers respectively have fiber-reinforcement and do not have coherent bonding to one another or have only partial coherent bonding to one another, and in the event that at least one of the polymer layers comprises a semicrystalline polymer the first temperature $T_a$ is higher than a melting point $T_m$ of the crystalline polymer in accordance with DIN EN ISO 11357-3:2013-04, and in the event that the at least two polymer layers comprise no semicrystalline polymer the first temperature $T_a$ is higher than a glass transition temperature $T_g$ in accordance with DIN EN ISO 11357-2:2013-09 of a polymer comprised in at least one of the at least two polymer layers, b) pressing of the heated at least one multilayer, fiber-reinforced, flat semifinished-product structure to give a finished part at a second temperature $T_b$ and at a pressure $p_b$ of at least 3 bar.

By virtue of the combination of materials and process it is possible to produce, in the component mold, fully consolidated finished parts with a plurality of layers by starting from multilayer semifinished-product structures that have not been fully consolidated. The use of fiber-reinforced polymer layers, which are preferably single-layer-fully-consolidated semifinished products in the form of, for example, tapes, it is possible to reduce cost in the production of finished parts and at the same time to produce a finished part which does not have the disadvantages described in the prior art and which in particular features good mechanical properties, in particular in relation to tensile strength and flexural strength. Production of the finished parts can use single-layer-fully-consolidated polymer layers, also described as tapes or semifinished products. The polymer layers are arranged in the form of semifinished-product structures which have not been, or have not been fully, multilayer-consolidated, examples being tape layups. The expression full consolidation means that the fibers have been fully wetted. In the invention, full multilayer consolidation of the individual polymer layers does not take place until the individual layers are further processed to give the finished part, i.e. until steps a) and b) take place. The entire production process for the finished part can therefore omit an intermediate step, namely that in which the semifinished-product structure is subjected to full-surface multilayer pressing or to full consolidation, before the actual finished part is produced.

The process of the invention can increase the productivity of the production process for finished parts, since it is possible to save the time required for the separate production of fully multilayer-consolidated semifinished-product structures, for example fully consolidated organopanels.

The finished part is produced from a layer structure comprising at least two mutually superposed polymer layers which respectively have single-layer fiber-reinforcement. The at least two polymer layers can generally be any single-layer semifinished product known to the person skilled in the art. It is preferable that the polymer layers are tapes.

For the purposes of the invention, "coherent" means that a polymer composition continuously encloses various layers, in particular various layers of a fiber-reinforcing structure, and that these have only low pore content. High pore content would impair the mechanical properties of the finished part. In contrast to this, layers not coherently bonded to one another have been merely mutually superposed without, between the layers, any continuous bonding provided by a polymer mass covering all of the layers. In the case of partial coherent bonding between the layers, the various layers adhere to one another in individual regions of their surfaces facing toward one another; this can result from previous heating of mutually superposed layers in the form of a layer system. This heating upstream of the process of the invention can be carried out at superatmospheric pressure. By virtue of this treatment, the polymer of the layers can be partially melted, and polymers of adjacent layers can fuse partially to one another, and the layers can thus undergo partial coherent bonding while, however, fused polymer does not entirely remove the separation of the layers.

Upstream of the steps a) and b) there can be steps for the production of the at least one multilayer, fiber-reinforced, flat semifinished-product structure. The production of the at least one multilayer, fiber-reinforced, flat semifinished-product structure can comprise a consolidation process carried out only to an incomplete extent. In one embodiment, the at least two polymer layers of the at least one fiber-reinforced, flat semifinished-product structure can already have undergone partial coherent bonding to one another before step a).

It is preferable that each of the at least two polymer layers is a fully consolidated layer. In one preferred embodiment, before step a), the at least two polymer layers are respectively fully consolidated via pressing at a temperature $T_v$ in the range from 240° C. to 280° C. and at a pressure $P_v$ of more than 5 bar.

For the purposes of the process of the invention, a combination of the steps a) and b) then achieves full coherent bonding between the various polymer layers.

In one preferred embodiment, before step a) less than 80%, preferably less than 70%, with particular preference less than 50%, of a surface of the first polymer layer, which surface faces toward the second polymer layer, has interlock bonding to the second polymer layer.

The required temperature to which heating is carried out in step a) depends on the composition of the polymer of the at least two polymer layers. The first temperature $T_a$ and the second temperature $T_b$ are local temperatures relating to the core of the finished part to be produced or, respectively, to the center of the mutually superposed polymer layers. If the polymer of at least one of the polymer layers comprises a semicrystalline polymer, the first temperature $T_a$ is higher than the melting point $T_m$ of the crystalline polymer comprised. DIN EN ISO 11357-3:2013-04 describes an appropriate method for determining the melting point. If the at least one multilayer, fiber-reinforced, flat semifinished-product structure comprises no semicrystalline polymer, i.e. only amorphous polymers are involved, the first temperature $T_a$ is higher than the glass transition temperature $T_g$ of at least one polymer comprised in at least one polymer layer; DIN EN ISO 11357-2:2013-09 describes determination of this temperature.

The heating in step a) is carried out at ambient pressure, which is also termed atmospheric pressure and is generally about 1 bar. The pressing in step b) is carried out at a pressure $p_b$ of at least 3 bar absolute. It is preferable that the pressure is increased only when the first temperature $T_a$ has been reached.

It is preferable that the at least one multilayer, fiber-reinforced, flat semifinished-product structure is first heated, the first temperature $T_a$ being maintained for a certain time before the pressure is increased for the pressing process, so that consolidation of the fibers initially proceeds at ambient pressure. In one preferred embodiment the first temperature $T_a$ is maintained in step a) for a period of at least 5 seconds at ambient pressure, preferably at least 30 seconds, with particular preference at least 120 seconds. The heating to a temperature greater than the melting point $T_m$ can consolidate multilayer finished parts fully in the mold, without requirement for any prior production of a fully multilayer-consolidated semifinished-product structure, with construction of a sheet and with pressing to give a multilayer, fully consolidated semifinished-product structure or a multilayer, fully consolidated sheet.

In one preferred embodiment, the pressure $p_b$ is from 3 bar to 50 bar, preferably from 5 bar to 30 bar, and particularly preferably from 10 bar to 25 bar.

In one preferred embodiment, the first temperature $T_a$ and the second temperature $T_b$ are from 50° C. to 400° C., preferably from 100° C. to 350° C., and with particular preference from 200° C. to 320° C.

Any process known to the person skilled in the art can be used for the heating in step a). In one preferred embodiment, the heating takes place without contact. It is particularly preferable that the heating takes place by means of infrared radiation or in a convection oven.

In one preferred embodiment, the second temperature $T_b$ is the same as or higher than the first temperature $T_a$. It is preferable that in step a) the at least one semifinished-product structure is heated to a temperature that is required during the pressing process for the production of a fully coherent bond between the layers of the semifinished-product structure. The pressing procedure can further increase the temperature of the semifinished-product structure.

The pressing in step b) represents the actual finished-part-production step, comprising consolidation and/or calibration. In one preferred embodiment, in step b) a thickness of the finished part is established via pressing to a range of from 1 mm to 4 mm or step b) is followed by another step in which the thickness of the finished part is established via pressing to a range of from 1 mm to 4 mm.

The pressing process can take place in presses, mold-carrier systems, injection molds, or injection-molding machines.

In one preferred embodiment, the finished part is cooled after the pressing process.

In another preferred embodiment, the finished part in step b) is additionally in-mold-coated. In-mold coating of continuous-filament-fiber-reinforced plastics sheets is described by way of example in Marko Wacker et al., "Schweißen and Umspritzen von Organoblechen" [Welding and in-mold coating of organopanels], KU Kunststoffe, Carl Hanser Verlag, Munich, 1992 (2002), 6. In-mold coating can attach functional elements to the finished part. The in-mold coating process can use a polymer which is already comprised in at least one of the polymer layers; alternatively it is possible that this process uses another polymer not yet comprised in the semifinished-product structure. The parameters used for the injection of the polymer are those conventional for the injection-molding process.

In another preferred embodiment, step b) is followed by a step c) in which the finished part is subjected to a forming process via thermoforming, or the finished part is in-mold coated or elements are injection-molded onto the finished part. By way of example, ribs can be injected onto the finished part for reinforcement of same. Other supplementary elements which can result from an injection-molding process are functional elements such as receivers for fixing elements, clips, force-introduction elements, or structures to receive screw threads.

In order to obtain increased strength it is preferable that the injected polymer forms a coherent skin on the finished part between the functional elements. In particular when a plurality of functional elements are molded adjacent to one another, the coherent skin between the functional elements provides additional stabilization of the functional elements. The coherent skin here is formed by providing a narrow flow channel between the functional elements and injecting the polymer material into the flow channel.

In-mold coating or injection-molding onto the material further improves the bonding between the various polymer layers. Another possibility is flow-coating of the finished part and thus of the layer structure with polymer, thus generating a pressure above ambient pressure and achieving a defined surface structure and/or a higher level of surface quality in respect, by way of example, of reduced roughness or improved optical properties in the finished part. Another result is good adhesion between the polymer used for flow-coating, which then forms a coating, and the finished part.

Polymers suitable for the in-mold-coating process, or for injection-molding onto the material, are polymers that are injection-moldable. The injection-moldable polymers can have fiber-reinforcement by long fibers or by short fibers. Use of different polymers in the polymer layers of the finished part on the one hand and for the in-mold-coating process, or injection-molding onto the material, on the other hand is in particular advantageous when the intention is to achieve particular properties for example in respect of surface quality or of strength.

Suitable polymers for use in the process of the invention are in particular thermoplastic polymers. In one preferred embodiment, the at least two polymer layers respectively comprise at least 50% by weight, preferably at least 70% by weight, and with particular preference at least 90% by weight, based in each case on the polymer, of polyolefins, for example polyethylene or polypropylene, polyvinyl polymers such as polyvinyl chloride, polyvinyl acetals, polyvinyl ethers, polyvinyllactams, or polyvinylamines, styrene polymers, for example polystyrene, styrene-acrylonitrile copolymers, acrylonitrile-butadiene-styrenes, polymers of (meth)acrylic acid, for example polyacrylic acid, poly(meth)acrylic esters, polyacrylates, polymethyl methacrylate, polyacrylamide, polycarbonates, polyoxymethylene, polyphenylene ethers, polytetrafluoroethylene, polyphenylene sulfide, polyether sulfones, polyether ketones, polyimides, polyquinoxalines, polyquinolines, polybenzimidazoles, polyamides, polyesters, or polyurethanes such as polyisocyanates, polyols, polyether polyols, or polyester polyols, or a mixture thereof. Particular preference is given to polyamides and polyesters such as polybutyleneterephthalate.

Preferred polyamides are PA6, PA12, PA4.6, PA66, PA6.10, PA6.12, PA10.10, PA12.12, PA13.13, PA6.T, PA9.T, PA MXD.6, PA6/6.6, PA6/6.T, PA6.I/6.T, PA6/6.6/6.10, also known as nylon-6, nylon-6,6, nylon-4,6, nylon-6,T copolyamides, and nylon-6/6,6.

In order to adjust the properties of the finished part, the at least two polymer layers can comprise additives. Examples of these are stabilizers, lubricants, nucleating agents, dyes, hardeners, plasticizers, blends with other polymers, and any desired other additives known to the person skilled in the art.

In one preferred embodiment, the at least two polymer layers comprise the same polymer as matrix material. Alternatively, finished parts can also be produced from a plurality of fiber-reinforced polymer layers which comprise different polymers as matrix material.

In one preferred embodiment, the polymer layers have reinforcement by a fiber structure, where the fiber structure preferably comprises a woven fabric, a knitted fabric, a braided fabric, a laid scrim, a nonwoven, or a unidirectional or bidirectional fiber structure made of parallel fibers or of unordered fibers, yarns, threads, or cords. The fiber structures of the various polymer layers can have parallel orientation with respect to one another, or no specific orientation, or can be at an angle to one another. With particular preference, the fiber structures take the form of woven fabric or of layers of parallel-oriented fibers, yarns, threads, or cords.

If layers of parallel-oriented fibers, yarns, threads or cords at an angle to one another are used, it is particularly preferable that the angle between the respective individual layers is 90° (bidirectional structure). If three layers or a multiple of three layers is/are used it is also possible to arrange the individual layers at an angle of 60° to one another, and if four layers or a multiple of four layers is/are used it is also possible to arrange the individual layers at an angle of 45° to one another. It is also possible moreover to provide more than one layer of fibers with identical orientation. It is likewise possible here that there are layers at an angle to one another, and the number of layers here with fibers with identical orientation can be different in each of the orientations of the fibers, an example being four layers in a first direction and one layer in a direction at an angle of, by way of example, 90° thereto (bidirectional structure with preferential direction). There is moreover also a known quasi-isotropic structure in which the fibers of a second layer are arranged at an angle of 90° to fibers of a first layer, and fibers of a third layer are moreover arranged at an angle of 45° to the fibers of the second layer. It is preferable that the direction of all of the fibers is the same.

In one preferred embodiment, fibers of the fiber structure are carbon fibers, glass fibers, aramid fibers, metal fibers, polymer fibers, potassium titanate fibers, boron fibers, or mineral fibers, for example basalt fibers. Particular preference is given to glass fibers and carbon fibers.

The proportion of fibers, based on the entire volume of the semifinished-product structure, is preferably up to 70% by volume.

Examples of finished parts which can be produced in this way are parts of vehicle bodywork, structural components for vehicles, for example floors or roofs, constituent components for vehicles, for example assembly supports, seat structures, door cladding, or interior cladding. The finished parts produced can be used for bulkheads, battery holders, side-impact members, bumper systems, structural inserts, or column reinforcement systems in motor vehicles, or else for side walls, structural wheel surrounds, or longitudinal members in vehicle bodywork. The finished parts are also equally suitable as components for wind turbines or rail vehicles.

EXAMPLES

Comparative Example

Two fully multilayer-consolidated semifinished-product structures were heated to 260° C. in an infrared radiation field and processed via pressing in a component mold to give in each case a finished part. The two semifinished-product structures comprised respectively six polymer layers, in each case fiber-reinforced. PA6 was used as polymer. In the first semifinished-product structure there were four polymer layers oriented parallel in respect of their fiber reinforcement, the two exterior polymer layers being parallel to one another and at an angle of respectively 90° to their adjacent layers. In the second semifinished-product structure there were also four polymer layers in total, oriented parallel. The two layers that were, seen from the outside, in second place in the six layers were parallel to one another and at an angle of 90° to the adjacent layers. PA6-GF35 was used for in-mold coating. The thickness of the finished parts was 1.5 mm.

Finished parts were produced with good optical surface properties and good mechanical properties.

Inventive Example

Three multilayer semifinished-product structures with their polymer layers mutually superposed but not bonded to one another were heated to 260° C. in an infrared radiation field and processed via pressing in a component mold to give in each case a finished part. PA6 was used as polymer. The temperature of 260° C. was maintained for from 2.5 min to 3 min before the pressing process. The semifinished-product structures comprised respectively six polymer layers, in each case fiber-reinforced. In all of the semifinished-product structures there were four polymer layers oriented parallel in respect of their fiber reinforcement, the two exterior polymer layers being parallel to one another and at an angle of respectively 90° to the adjacent layer. PA6-GF35 was used for in-mold coating. The thickness of the finished parts was 1.5 mm.

Although, unlike in the comparative example, there was no full consolidation of the multilayer semifinished-product structure upstream of finished-part production, finished parts were produced having optical and mechanical properties just as good as the properties of the finished parts of the comparative example.

The invention claimed is:

1. A process for producing finished parts made of at least one multilayer, fiber-reinforced, flat semifinished-product structure, the process comprising:
    a) heating at least one multilayer, fiber-reinforced, flat semifinished-product structure at ambient pressure to a first temperature $T_a$ and maintaining the first temperature $T_a$ for a period of at least 30 seconds at ambient pressure, wherein the at least one multilayer, fiber-reinforced, flat semifinished-product structure comprises at least two mutually superposed polymer layers where individual polymer layers respectively have fiber-reinforcement and do not have coherent bonding to one another or have only partial coherent bonding to one another, and in the event that at least one of the polymer layers comprises a semicrystalline polymer the first temperature $T_a$ is higher than a melting point $T_m$ of the crystalline polymer in accordance with DIN EN ISO 11357-3:2013-04, and in the event that the at least two polymer layers comprise no semicrystalline polymer the first temperature $T_a$ is higher than a glass transition temperature $T_g$ in accordance with DIN EN ISO 11357-2:2013-09 of a polymer comprised in at least one of the at least two polymer layers; and
    b) pressing the heated at least one multilayer, fiber-reinforced, flat semifinished-product structure to give a finished part at a second temperature $T_b$ and at a pressure $p_b$ of at least 3 bar,
    wherein the pressing in b) comprises consolidation, calibration, or both, and
    before the heating and maintaining in a), less than 80% of a surface of a first polymer layer in the at least two polymer layers has interlock bonding to a second polymer layer in the at least two polymer layers, a surface of the first polymer layer facing toward the second polymer layer.

2. The process according to claim 1, wherein each of the at least two polymer layers is a fully consolidated layer.

3. The process according to claim 2, wherein, before the heating and maintaining in a), the at least two polymer layers are respectively fully consolidated via pressing at a temperature $T_v$ in the range from 240° C. to 280° C. and at a pressure $P_v$ of more than 5 bar.

4. The process according to claim 1, wherein the first temperature $T_a$ is maintained in a) for a period of at least 120 seconds at ambient pressure.

5. The process according to claim 1, wherein the second temperature $T_b$ is the same as or higher than the first temperature $T_a$.

6. The process according to claim 1, wherein the pressing in b) follows the heating and maintaining a) directly.

7. The process according to claim 1, further comprising: in-mold coating the finished part obtained in b).

8. The process according to claim 1, further comprising: injection-molding an element onto the finished part obtained in b).

9. The process according to claim 1, wherein the heating takes place without contact.

10. The process according to claim 1, wherein the heating takes place by means of infrared radiation or in a convection oven.

11. The process according to claim 1, wherein in b) a thickness of the finished part is established via pressing to a range of from 1 mm to 4 mm, or the process further comprises pressing the finished part obtained in b) such that the finished part has a thickness in a range of from 1 mm to 4 mm.

12. The process according to claim 1, wherein the at least two polymer layers respectively comprise at least 50% by weight, based on the polymer, of polyolefins, polyvinyl polymers, styrene polymers, acrylonitrile-styrene copolymers, acrylonitrile-butadiene-styrenes, polymers of (meth) acrylic acid, polymethyl methacrylates, polyacrylates, polyacrylamides, polycarbonates, polyphenylene ethers, polyphenylene sulfides, polyether sulfones, polyether ketones, polyimides, polyquinoxalines, polyquinolines, polybenzimidazoles, polyamides, polyesters, polyurethanes, or mixtures thereof.

13. The process according to claim 1, wherein the at least two polymer layers comprise the same polymer as matrix material.

14. The process according to claim 1, wherein the at least two polymer layers respectively have reinforcement by a fiber structure.

15. The process according to claim 14, wherein fibers of the fiber structure are carbon fibers, glass fibers, aramid fibers, metal fibers, polymer fibers, potassium titanate fibers, boron fibers, or mineral fibers.

16. The process according to claim 1, wherein, prior to the heating in a), the polymer layers in the at least one multilayer, fiber-reinforced, flat semifinished-product structure have partial coherent bonding to one another.

17. A process for producing finished parts made of at least one multilayer, fiber-reinforced, flat semifinished-product structure, the process comprising:
 a) heating at least one multilayer, fiber-reinforced, flat semifinished-product structure at ambient pressure to a first temperature $T_a$ and maintaining the first temperature $T_a$ for a period of at least 30 seconds at ambient pressure, wherein the at least one multilayer, fiber-reinforced, flat semifinished-product structure comprises at least two mutually superposed polymer layers where individual polymer layers respectively have fiber-reinforcement and do not have coherent bonding to one another or have only partial coherent bonding to one another, and in the event that at least one of the polymer layers comprises a semicrystalline polymer the first temperature $T_a$ is higher than a melting point $T_m$ of the crystalline polymer in accordance with DIN EN ISO 11357-3:2013-04, and in the event that the at least two polymer layers comprise no semicrystalline polymer the first temperature $T_a$ is higher than a glass transition temperature $T_g$ in accordance with DIN EN ISO 11357-2:2013-09 of a polymer comprised in at least one of the at least two polymer layers; and
 b) pressing the heated at least one multilayer, fiber-reinforced, flat semifinished-product structure to give a finished part at a second temperature $T_b$ and at a pressure $p_b$ of at least 3 bar,
 wherein the pressing in b) comprises consolidation, calibration, or both,
 each of the at least two polymer layers is a fully consolidated layer, and
 before the heating and maintaining in a), the at least two polymer layers are respectively fully consolidated via pressing at a temperature $T_v$ in the range from 240° C. to 280° C. and at a pressure $P_v$ of more than 5 bar.

18. The process according to claim 17, wherein the first temperature $T_a$ is maintained in a) for a period of at least 120 seconds at ambient pressure.

19. A process for producing finished parts made of at least one multilayer, fiber-reinforced, flat semifinished-product structure, the process comprising:
 a) heating at least one multilayer, fiber-reinforced, flat semifinished-product structure at ambient pressure to a first temperature $T_a$ and maintaining the first temperature $T_a$ for a period of at least 30 seconds at ambient pressure, wherein the at least one multilayer, fiber-reinforced, flat semifinished-product structure comprises at least two mutually superposed polymer layers where individual polymer layers respectively have fiber-reinforcement and do not have coherent bonding to one another or have only partial coherent bonding to one another, and in the event that at least one of the polymer layers comprises a semicrystalline polymer the first temperature $T_a$ is higher than a melting point $T_m$ of the crystalline polymer in accordance with DIN EN ISO 11357-3:2013-04, and in the event that the at least two polymer layers comprise no semicrystalline polymer the first temperature $T_a$ is higher than a glass transition temperature $T_g$ in accordance with DIN EN ISO 11357-2:2013-09 of a polymer comprised in at least one of the at least two polymer layers; and
 b) pressing the heated at least one multilayer, fiber-reinforced, flat semifinished-product structure to give a finished part at a second temperature $T_b$ and at a pressure $p_b$ of at least 3 bar,
 wherein the pressing in b) comprises consolidation, calibration, or both, and
 in b), a thickness of the finished part is established via pressing to a range of from 1 mm to 4 mm, or the process further comprises pressing the finished part obtained in b) such that the finished part has a thickness in a range of from 1 mm to 4 mm.

20. The process according to claim 19, wherein the first temperature $T_a$ is maintained in a) for a period of at least 120 seconds at ambient pressure.

* * * * *